United States Patent
Papa (10) Patent No.: US 11,689,417 B2
(45) Date of Patent: *Jun. 27, 2023

(54) COMMUNITY SELF-MANAGED RADIO ACCESS NETWORK

(71) Applicant: Parallel Wireless, Inc., Nashua, NH (US)

(72) Inventor: Steven Paul Papa, Windham, NH (US)

(73) Assignee: Parallel Wireless, Inc., Nashua, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/517,606

(22) Filed: Nov. 2, 2021

(65) Prior Publication Data

US 2022/0060378 A1 Feb. 24, 2022

Related U.S. Application Data

(63) Continuation of application No. 16/264,429, filed on Jan. 31, 2019, now Pat. No. 11,165,641.

(60) Provisional application No. 62/624,302, filed on Jan. 31, 2018.

(51) Int. Cl.
| | |
|---|---|
| H04L 41/0813 | (2022.01) |
| H04L 41/22 | (2022.01) |
| H04W 24/10 | (2009.01) |
| H04W 84/12 | (2009.01) |
| H04W 84/04 | (2009.01) |

(52) U.S. Cl.
CPC ......... H04L 41/0813 (2013.01); H04L 41/22 (2013.01); H04W 24/10 (2013.01); H04W 84/042 (2013.01); H04W 84/12 (2013.01)

(58) Field of Classification Search
CPC .... H04L 41/0813; H04L 41/22; H04W 24/10; H04W 84/042; H04W 84/12
USPC .......................................................... 709/223
See application file for complete search history.

(56) References Cited

U.S. PATENT DOCUMENTS

| | | | | |
|---|---|---|---|---|
| 2010/0210255 | A1* | 8/2010 | Amirijoo | H04W 74/002 455/419 |
| 2013/0084809 | A1* | 4/2013 | Johansson | H04W 72/20 455/67.11 |
| 2014/0335881 | A1* | 11/2014 | Rubin | H04L 67/56 455/452.1 |
| 2015/0103755 | A1* | 4/2015 | Cui | H04W 28/0284 370/329 |
| 2016/0212666 | A1* | 7/2016 | Zalzalah | H04W 36/14 |

(Continued)

Primary Examiner — Hermon Asres
(74) Attorney, Agent, or Firm — Michael Y. Saji; David W. Rouille (57) ABSTRACT

In some embodiments, a local community may manage its own RAN via a simple, secure, self-service user interface in conjunction with a mobile operator. An exemplary system is disclosed, including: at least two base stations providing wireless access to one or more mobile devices and located in a community; a gateway providing a connection to a core network for the at least two base stations; a management functionality in the core network, in communication with the gateway, for authorizing management activities for the at least two base stations; and a user-facing administration module in communication with the management functionality, the user-facing administration module having: a user interface for providing management control to an administrative user in the community.

14 Claims, 7 Drawing Sheets

(56) References Cited

U.S. PATENT DOCUMENTS

2016/0242111 A1* 8/2016 Wakabayashi .......... H04W 4/70
2018/0026944 A1* 1/2018 Phillips ............... H04L 63/1433
                                                        726/4

* cited by examiner

COMMUNITY SELF-MANAGED RADIO ACCESS NETWORK

CROSS-REFERENCE TO RELATED APPLICATIONS

This application is a continuation of U.S. application Ser. No. 16/264,429, filed Jan. 31, 2019, which is a non-provisional conversion of, and claims priority under 35 U.S.C. § 119(e) to, U.S. Provisional Patent Application No. 62/624, 302, entitled "Community Self-Managed Radio Access Network" and filed Jan. 31, 2018, each of which is hereby incorporated by reference herein in its entirety for all purposes. In addition, this application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. Pat. No. 14,034,915, "Dynamic Multi-Access Wireless Network Virtualization," filed Sep. 24, 2013; U.S. Pat. No. 14,289,821, "Method of Connecting Security Gateway to Mesh Network," filed May 29, 2014; U.S. Pat. No. 14,500,989, "Adjusting Transmit Power Across a Network," filed Sep. 29, 2014; U.S. Pat. No. 14,506,587, "Multicast and Broadcast Services Over a Mesh Network," filed Oct. 3, 2014; U.S. Pat. No. 14,510,074, "Parameter Optimization and Event Prediction Based on Cell Heuristics," filed Oct. 8, 2014, U.S. Pat. No. 14,642, 544, "Federated X2 Gateway," filed Mar. 9, 2015, and U.S. Pat. No. 14,936,267, "Self-Calibrating and Self-Adjusting Network," filed Nov. 9, 2015, each in its entirety for all purposes.

BACKGROUND

Management is one of the significant costs in deploying a new radio access network (RAN) or providing mobile or cellular services to a new locality or community. For example, network hardware is typically managed actively to achieve high performance; performance for end users is typically managed to ensure that their quality of service (used here in the general sense) is up to an acceptable standard; subscribers are managed such that they are enabled to be aware of their current plan usage and current billing level; and a business unit is typically tasked with maintaining awareness of the profitability of service delivery to the locality or community, which entails at least being aware of how much money is being spent on delivery of services for any given period of time. This management cost is relatively fixed over various sizes of communities. Without all of these pieces in place, it is uneconomical for a service provider to provide service to a given community. It follows that, if the cost of management were to be reduced, it would be possible to provide service to smaller communities, as well as other communities which would otherwise be uneconomical to provide access to, such as extremely rural communities.

Self-managed private branch exchanges (PBXes) may, in some cases, be owned and operated by entities other than telecommunications network operators. For example, a large company may obtain the rights to use a block of telephone numbers from a telecommunications operator and may own, run, and manage its own switching and management devices, including PBXes and VoIP desk phones. However, even for the largest institutions, maintenance and management of PBXes is complex and often management of such devices and networks is outsourced to contractors and network operators, even when the network is owned by the enterprise.

SUMMARY

In some embodiments, a local community may manage its own RAN via a simple, secure, self-service user interface in conjunction with a mobile operator.

In some embodiments, a local community may be enabled to operate its own telecommunications network that is interoperable with industry-standard telecommunications handsets (e.g., 2G, 3G, 4G, 5G) and global telecommunications operator networks.

In some embodiments, the local community may own its telecommunications network hardware, up to and including a network gateway, the network gateway providing access to a telecommunications operator's network.

In some embodiments, individual end users of the community may manage their own account on the self-managed network, or may manage the entirety of the self-managed network itself.

In a first embodiment, a system may be disclosed, comprising: at least two base stations providing wireless access to one or more mobile devices and located in a community; a gateway providing a connection to a core network for the at least two base stations; a management functionality in the core network, in communication with the gateway, for authorizing management activities for the at least two base stations; and a user-facing administration module in communication with the management functionality, the user-facing administration module having: a user interface for providing management control to an administrative user in the community.

The at least two base stations may provide access to the one or more mobile devices using one or more of: 2G, 3G, 4G Long Term Evolution (LTE), 5G, or Wi-Fi. The at least two base stations may share a wireless backhaul connection. The at least two base stations may be managed by the management functionality. The management functionality in the core network may be configured to provide operational control of one or more of: per-user throughput; per-user total data for a specified period; per-user priority; and priority for user plane data sent between the at least two base stations and the core network. The management functionality in the core network may be configured to provide operational control of one or more of: transmit power; antenna directionality; modulation schemes; physical layer (PHY) parameters; mesh network routing; backhaul link selection; and radio access technology (RAT) steering. The at least two base stations may be managed together by the management functionality as part of a single community-managed radio access network (RAN). The at least two base stations may have a secure connection with the gateway. The gateway has a secure connection with the management functionality in the core network. The at least two base stations may be managed together or separately, and any of their various parameters, including radio parameters and other operational parameters, may be managed. Quality of service tools for IP packet filtering and control may be used to enforce bandwidth and throughput limits.

The user-facing administration module may be located at one of the at least two base stations or at the gateway. The user-facing administration module may be located on the Internet or located on a network accessed via the core network. The user-facing administration module enables the administrative user to monitor user usage statistics for individual end users in the community. The user-facing administration module enables the administrative user to monitor user usage statistics and available bandwidth on a backhaul connection for the community. The user-facing administration module enables individual end users in the community to upgrade a service plan, and the user-facing administration module causes an operational change to be made in the at least two base stations based on the upgraded service plan. The user-facing administration module enables individual end users to initiate payment.

Other embodiments and various features thereof that are contemplated by the inventors are found in the following disclosure.

DETAILED DESCRIPTION

Benefits of Reduced-Cost Management

There are a variety of models of network deployment that are underutilized today that make sense when network management is made more transparent, enabling the development of low-cost mobile virtual network operator (MVNO) and community self-managed RAN models. In the present disclosure, a self-managed RAN is used as an example but in many instances the inventors have appreciated the value of the present disclosure for MVNOs as well, and the term self-managed RAN is intended to also include MVNOs where contextually appropriate.

"Dark Fiber" and Underutilized Capacity

In certain network environments, there is sufficient infrastructure to support more network services than are being currently provided. The simple example is of network capacity at night. Usually, users use the network a great deal during the day and their usage declines during the night; the network operator therefore has underutilized network capacity at night. This is largely the same for wired and for wireless infrastructure, e.g., with wireless infrastructure, certain frequencies are being used by certain users at certain times of day. However, due to the current model of owner-operated network infrastructure, the mobile operator, who is the owner of the network, has no incentive to further use the underutilized nighttime capacity beyond providing "unlimited" plans to its customers. This excess capacity in the existing infrastructure could be used by a community self-managed RAN or by an MVNO, if operation were made sufficiently transparent and low-cost.

Other examples of excess capacity in the existing infrastructure are existing owner-managed infrastructure, such as corporate PBXes and on-premises network servers; cable TV and Internet providers/operators; and fixed Wi-Fi and residential broadband Internet service. Such services also are subject to a surplus of capacity during certain times of day. For example, for residential broadband, excess capacity is available when users are at their workplaces, and at night, when users are sleeping. Such excess capacity could be bundled and utilized for mobile service, or for IP-based backhaul for a mobile network, using management tools such as the tools described herein.

The disclosed systems and methods can facilitate new ways of engaging with customers, as well as new methods for management. For example, the systems and methods may enable, in some embodiments, implementation of fine-grained dynamic management of access down to a specific radio, a minimum bandwidth guarantee, and detailing accounting of a user's data consumption in real-time to dynamically change a user's bandwidth guarantee. The disclosed systems can take into account under-utilized macro RAN capacity in real time. This enables providing users with more capacity if it is available, at zero marginal cost, thereby giving them the best possible user experience without additional expense.

The community members gets the benefit of guaranteed bandwidth and availability of services at a reasonable cost. The mobile operator gets the benefit of financial reward while the network resources are used at a constant level, providing the additional advantage that network resource planning becomes smooth due to availability of upfront bandwidth requirement data.

The disclosed systems and methods enable, together with the technology in the RAN as well, the use of existing cellular networks (for example, LTE macro base stations) for backhaul. Backhaul is the network connection from any sub-network to the telecommunications provider core network and to the global Internet. Typically, backhaul is important because its quality and consistency directly affects the delivered quality of service; management tools can improve the delivered quality of service, but can also enable costly dedicated backhaul to be replaced with dedicated or shared peer-to-peer backhaul or wireless backhaul, or can enable the integration of multiple backhaul links for a single network, as disclosed in, for example, U.S. Pat. Nos. 9,386, 480 and 9,832,796, which are hereby incorporated by reference in their entirety.

The disclosed systems and methods contemplate the use of 5G network slicing. Each community may have a network slice within an operator network using 5G network slicing, network tunnels with QoS, etc. The dedicated network slice can be used for backhaul, in some embodiments. The disclosed systems can, in various embodiments, interoperate with 5G non-standalone, standalone, Internet of Things (IOT), narrowband IOT, as well as other types of networks.

Incentivizing New Plans

The inventors have appreciated that there is a market opportunity not only in reducing the cost of network management, but also in enabling a mobile operator to gradually build out network infrastructure based on need. A key insight is that the community itself can be mobilized to increase network penetration by providing the community with information about the network. A mobile operator may commit to investing further resources in a network if it is profitable, and profitability is related to the number of subscribers. The information about number of subscribers can be made available to the users of the network, and the mobile operator or community self-managed network operator can reduce prices appropriately if additional users sign up.

When customers are given the ability to manage their own networks, they may also be enabled to, and may be given, the incentive to participate in their own plan development, their own radio hosting, their own backhaul bandwidth, their own electricity and HVAC, etc. If the community provides to support the radio access network site for macro base station or eNodeBs by providing land, electricity, etc., the community may be provided benefit in the form of guaranteed bandwidth irrespective of the congestion and other factors affecting availability of bandwidth. In these environments the management system may be configured to be able to show costs for each of the features that are provided by the customer, including with zero-rating of those features. In some embodiments, if certain individuals or entities, as users, are providing these resources, they may be provided a bill credit.

The Community Plan

The inventors have contemplated systems and methods for making available a community plan. An existing mobility plan subscriber at a minimum tier (for example, with a 5 GB monthly plan) may be eligible for the community plan. The community plan is a plan with a community hosted asset and managed by the community, in some embodiments. This community plan could be priced based on underlying resources required, including bandwidth. For example, each member can be billed based on the total cost of bandwidth divided by the bandwidth projected to be used by that member, and addition of more members shall reduce the cost for each member. As another example, each member of a community on the community plan can pay (can contribute additional funds), to enable the total overall community to add more dedicated bandwidth. An example of plan tiers could be: Silver, Gold, Platinum for individual users of the plan; Silver—unlimited and you get access guaranteed proportionate to how much you have consumed (if a data hog, your guarantee goes down); Gold—unlimited but 128 kbps guaranteed and more proportionate; and Platinum—unlimited but 500 kbps guaranteed, with differing price tiers for Silver, Gold, and Platinum.

In some embodiments, each community plan user added to the locally hosted microcell network can cause the network to automatically add 0.5 mbps of dedicated capacity from the macro donor. For example, 20 community plan users=10 mbps guaranteed. An increase of backhaul/capacity can be automatically managed at core. Unlimited data available for the group of community plan users, for example, using a minimum of 10 users in the group of users (in this case), could be higher if RAN/backhaul links underutilized. All traffic from community plan users can be tagged (on a per-packet, per-tunnel, per-session, per-bearer basis, etc.) so the mobile operator hosting the MVNO community plan can tell at all times if the community plan data pipe needs to be throttled further.

Community members can monitor their personal usage over a day, over a week, over a month, or over a year. The user can see the number of active users and available bandwidth over a specific period. Additionally, if the coordinating server or the application server determines based on historical data analysis that with the current number of users, enough bandwidth is available such that the existing user can have a increased guaranteed bandwidth, the user may be offered an option to upgrade. A user may request upgrade at will through the mobile application. The user can see other members in the community based on the privacy settings selected by the member users.

Transparent prioritization schemes can be enabled for the community plan. The inventors have appreciated that it is helpful for the users themselves to be able to see the metric being used to provide prioritization. The current state of the art for individual users depends on individuals directly measuring their own data usage using their own smartphones or devices to ensure they do not go over a cap. However, being able to monitor one's own usage with more granularity can be very helpful. By analogy, the value provided is like the value provided to a frequent flier checking to see if they will get an upgrade and seeing how many people are ahead of them.

A range of algorithms can be used. For example, a simple algorithm is to take the inverse proportion of the last 4 weeks volume of data over the communities total and guarantee that portion of the 10 mbps at any time. This can be recalculated every N minutes by the Coordinating Server. The transparency provided can entail showing a user their portion of the community network's dedicated pipe being used, as well as their data history. A mobile app can be used as a front-end application and the coordinating server can act as a backend server with communication via an API. A user can increase their portion of the pipe or obtain a dedicated portion of the pipe by clicking buttons in the app to, for example, extend their contract, or pay a higher monthly fee. A minimum guaranteed data rate may also be available—say 256 kbps or 512 kbps—for a fee.

In some embodiments, users of the mobile app can use it from their homes to see if there are any community assets that can be contributed to the community plan for the benefit of others, potentially thereby reducing their personal costs.

In some embodiments, users can join the Community Plan for unlimited access at home only, e.g., only to community assets accessible from your home, having unlimited use of a pool of community data from home, which is made possible by the user's use of their own home broadband for backhaul. In some embodiments a user may track how much data they have used and their guaranteed access to the community data using the mobile app. In some embodiments the user may encourage more users to join, to obtain more guaranteed bandwidth for the community from the underlying host mobile network operator.

Operator Management and Self-Management

An underlying mobile operator may provide the underlying connectivity to the global Internet and/or the global telephone network, in the same way as an MVNO has an underlying mobile operator. In some embodiments, this underlying operator may have management control over the community network, for example: Antenna alignment; power output; SNR; alarms for same (operator may receive alarms in any frequency). Thresholds and limits may be put into place to ensure that the community network does not take down (negatively impact) the operator network. The community network could use 5G network slicing, QCI/QOS/DSCP etc., and this could be managed by the underlying mobile operator to be compatible with their own network. The historical model is: cable operators; home customer can own and operate own router, modem, etc. but operator controls firmware updates to modem. The mobile operator retains control in these ways.

For example, if community plan users are taking up too much of macro capacity, the underlying mobile operator can perform management operations to, for example, add P2P backhaul link from macro to micro-cell network. It bears noting that increased revenue can be used to provision additional capacity. As another example, the underlying mobile operator can offer to permit a subscriber to host a cell to initiate a community plan anywhere in the underlying mobile operator's network.

In the rural context, this can assist the underlying mobile operator in building out its network. In the urban context, this can assist the underlying mobile operator to build out its network with a dense hetnet.

Alternatively, some or all of these management tools may be provided to the community, and the community could designate one or more users as administrators of the network, thereby providing self-management by the community.

Figure 1:
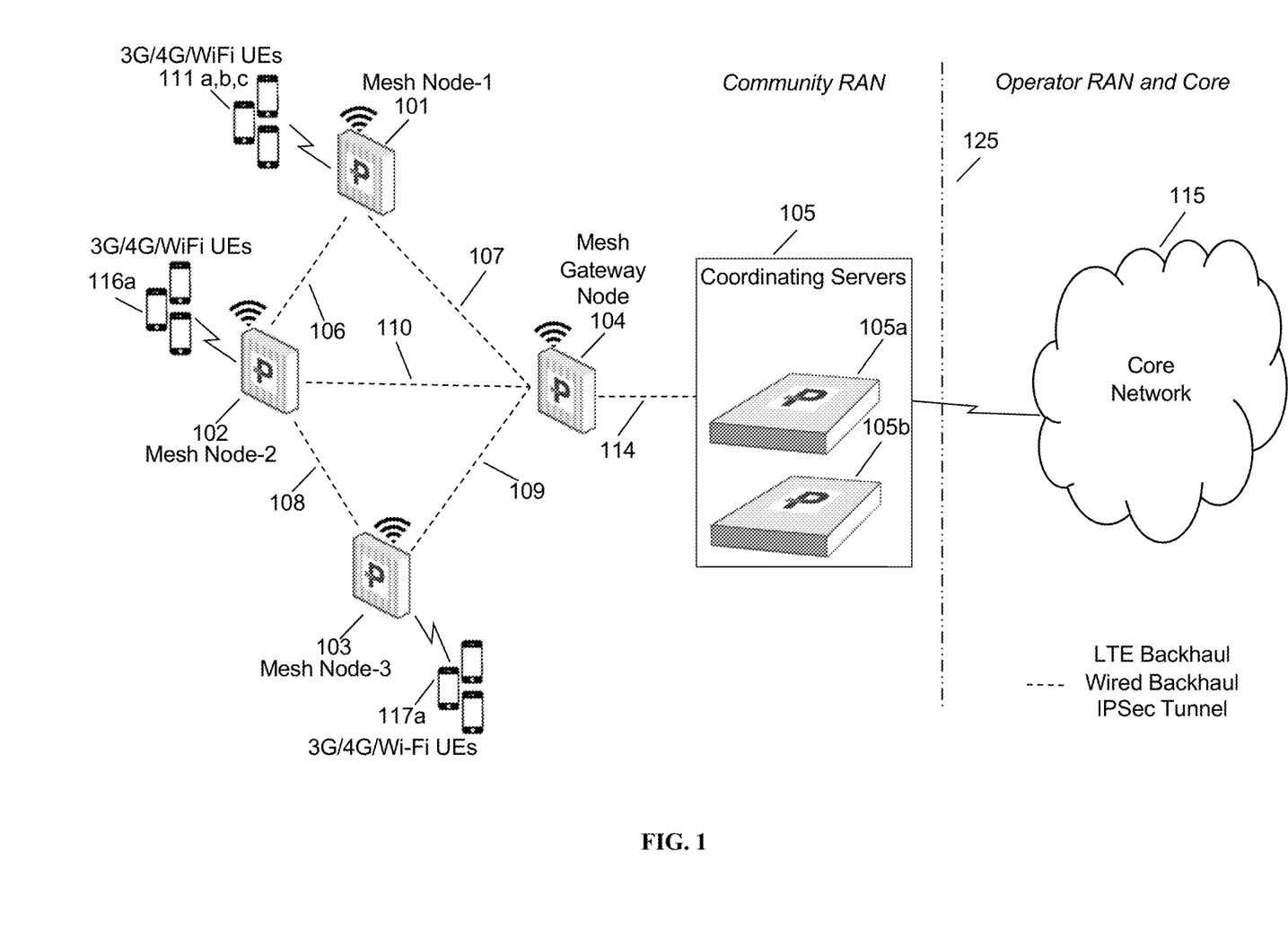
FIG. 1 is a schematic diagram of a wireless network, in accordance with some embodiments.

FIG. 1 is a schematic diagram of a wireless network, in accordance with some embodiments. In some embodiments, as shown in FIG. 1, a mesh node 1 101, a mesh node 2 102, and a mesh node 3 103 are multi-radio access technology (multi-RAT) base stations. Base stations 101, 102, and 103 form a mesh network establishing mesh network links 106, 107, 108, 109, and 110 with a base station 104. The mesh network links are flexible and are used by the mesh nodes to route traffic around congestion within the mesh network as needed. The base station 104 acts as gateway node or mesh gateway node, and provides backhaul connectivity to a core network to the base stations 101, 102, and 103 over backhaul link 114 to a coordinating server(s) 105 and towards core network 115. The Base stations 101, 102, 103, 104 may also provide eNodeB, NodeB, Wi-Fi Access Point, Femto Base Station etc. functionality, and may support radio access technologies such as 2G, 3G, 4G, 5G, Wi-Fi etc. The base stations 101, 102, 103 may also be known as mesh network nodes 101, 102, 103. While mesh nodes are depicted, any base stations could be used with the present disclosure, including 2G, 3G, 4G, 5G, Wi-Fi, etc. base stations with any form of backhaul.

Although backhaul connection 114 is identified as LTE backhaul in FIG. 1, any other backhaul could be used, including wired or wireless backhaul. It is worth noting that the use of a single backhaul connection for all nodes 101, 102, 103, which may itself be a wireless backhaul connection, enables the cost-effective deployment of a RAN in places where it might not otherwise make sense to offer a network. Also, the use of a single backhaul connection via an IP tunnel is further mediated and enabled by the coordinating server 105.

The coordinating servers 105 are shown as two coordinating servers 105a and 105b. The coordinating servers 105a and 105b may be in load-sharing mode or may be in active-standby mode for high availability. The coordinating servers 105 may be located between a radio access network (RAN) and the core network and may appear as core network to the base stations in a radio access network (RAN) and a single eNodeB to the core network, i.e., may provide virtualization of the base stations towards the core network as described in, e.g., U.S. Pat. No. 9,491,801, hereby incorporated by reference in its entirety. As shown in FIG. 1, various user equipments 111a, 111b, 111c are connected to the base station 101. The base station 101 provides backhaul connectivity to the user equipments 111a, 111b, and 111c connected to it over network links 106, 107, 108, 109, 110 and 114, which may be mesh networking links, line of sight (LOS) or non-LOS links, microwave, fiber optic, etc. The user equipments may be mobile devices, mobile phones, personal digital assistant (PDA), tablet, laptop etc. The base station 102 provides backhaul connection to user equipments 112a, 112b, 112c and the base station 103 provides backhaul connection to user equipments 113a, 113b, and 113c. The user equipments 111a, 111b, 111c, 112a, 112b, 112c, 113a, 113b, 113c may support any radio access technology such as 2G, 3G, 4G, 5G, Wi-Fi, WiMAX, LTE, LTE-Advanced etc. supported by the mesh network base stations, and may interwork these technologies to IP.

In some embodiments, depending on the user activity occurring at the user equipments 111a, 111b, 111c, 112a, 112b, 112c, 113a, 113b, and 113c, the uplink 114 may get congested under certain circumstances. As described herein, to provide mobility to the user equipments, the solution involves providing management to the base stations 101, 102, 103. The traffic from the base stations 101, 102, and 103 to the core network 115 through the coordinating server 105 flows through an IPSec tunnel terminated at the coordinating server 105. The network nodes 101, 102, and 103 adds IP Option header field to the outermost IP Header (i.e., not to the pre-encapsulated packets). The traffic may from the base station 101 may follow any of the network link path such as 107, 106-110, 106-108-109 to reach to the gateway node 104, according to a network routing protocol; an example protocol is found in U.S. Pat. App. Pub. No. US20160308755A1, hereby incorporated by reference in its entirety. In the case that traffic from the base station 101 flows through network 102 in the case the path selected is 106-110 to reach to the gateway node 104. In some embodiments, IP traffic may be classified, reclassified, or tagged with tags for management of the community RAN.

In some embodiments, certain elements of the network could be under the management of a community self-managed RAN organization. Demarcation line 125 shows how certain components, such as RAN nodes 101, 102, 103, 104 and coordinating servers 105/105a/105b, are managed by the community RAN, and how other components, namely, core network 115, are managed by the mobile operator. The community RAN organization may be given permissions to manage the RAN nodes, but not the core network 115. The network operator may be able to manage all the nodes shown, including the nodes on the community side of demarcation line 125, but may opt to provide self-management capabilities to the community RAN organization. The network operator may receive reporting and information from the community RAN organization, including billing and pricing information and also including operational information. The network operator may be able to override the management by the community RAN organization, for example, to keep performance within reasonable bounds, to handle misconfiguration by the community, etc.

In some embodiments, the gateway node 104 receives the message with IP Options header described above, and may parse the IP Options header to extract a traffic classification value. The gateway node 104 may map the traffic classification, as extracted from the fourth octet of the IP Options header, to a proper DSCP value to encode in messages or packets towards the coordinating server. The gateway node 104 may alternately or in conjunction map the traffic classification to a proper QCI value, if the uplink is through an LTE modem backhaul uplink to a macro eNodeB through another operator core network. The gateway node 104 receives the instructions on how to map the traffic classification to the DSCP/QCI as a configuration or a template from the coordinating server 105. This is especially important in the case that the network operator desires to provide service to its own customers using nodes 101, 102, 103 or coordination server 105.

In some embodiments, management may include applying DSCP and/or QCI values, or other tagging, both to provide QoS and to enable the mobile operator to track and provide reporting regarding usage by the community network. As well, and depending on the congestion as calculated by the gateway node 104 based on performance measurements, statistics, internal and external KPIs, and measurement of bandwidth available at the gateway node 104, the gateway nodes may put the packets in a different priority message queue. The gateway node 104 may also adjust the available link bandwidth or uplink bandwidth assigned to nodes 101, 102, 103 based on the congestion level and traffic load for varying priority level identified from the traffic classification field of the IP Options header. In some embodiments, these steps may be performed not at the gateway node but at the coordinating servers 105.

In some embodiments, all management functionality can be performed at coordinating servers 105. In some embodiments, certain management functionality, for example, establishment of secure connections with the UE or with the core network, tagging of traffic with QoS, DSCP, priority, etc., may be performed at the base stations. In some embodiments, certain management functionality may be provided at core network 115 in addition to coordinating servers 105, for: sending and receiving management instructions to and from a core network management facility or software module; interfacing with a billing server by setting, storing and retrieving information about community plans, community plan users, etc.; providing authorization for management operations by community administrative users; interfacing with the coordinating server for enacting management policies from the core network or from an administrative interface of the community network; etc. In some embodiments, coordinating servers 105 may provide a gateway for lawful intercept for the community network, which otherwise would not be possible for a mobile network not fully owned and operated by a mobile operator. The management functionality at the core network may be implemented in a software module that is configured with permissions and access to the core network's management functionality, and that has information about one or more of the base stations providing access, e.g., 101, 102, 103. In some embodiments, the management functionality may use the operator network's own security server (e.g., its Home Subscriber Server or HSS); in other embodiments, a separate security server may be used for the community network's users and devices. In some embodiments, the coordinating servers 105 may establish a secure connection, using various techniques known in the art (such as, for example, cryptographic key exchange, username/password, etc.), to the operator core network 115.

Figure 2:
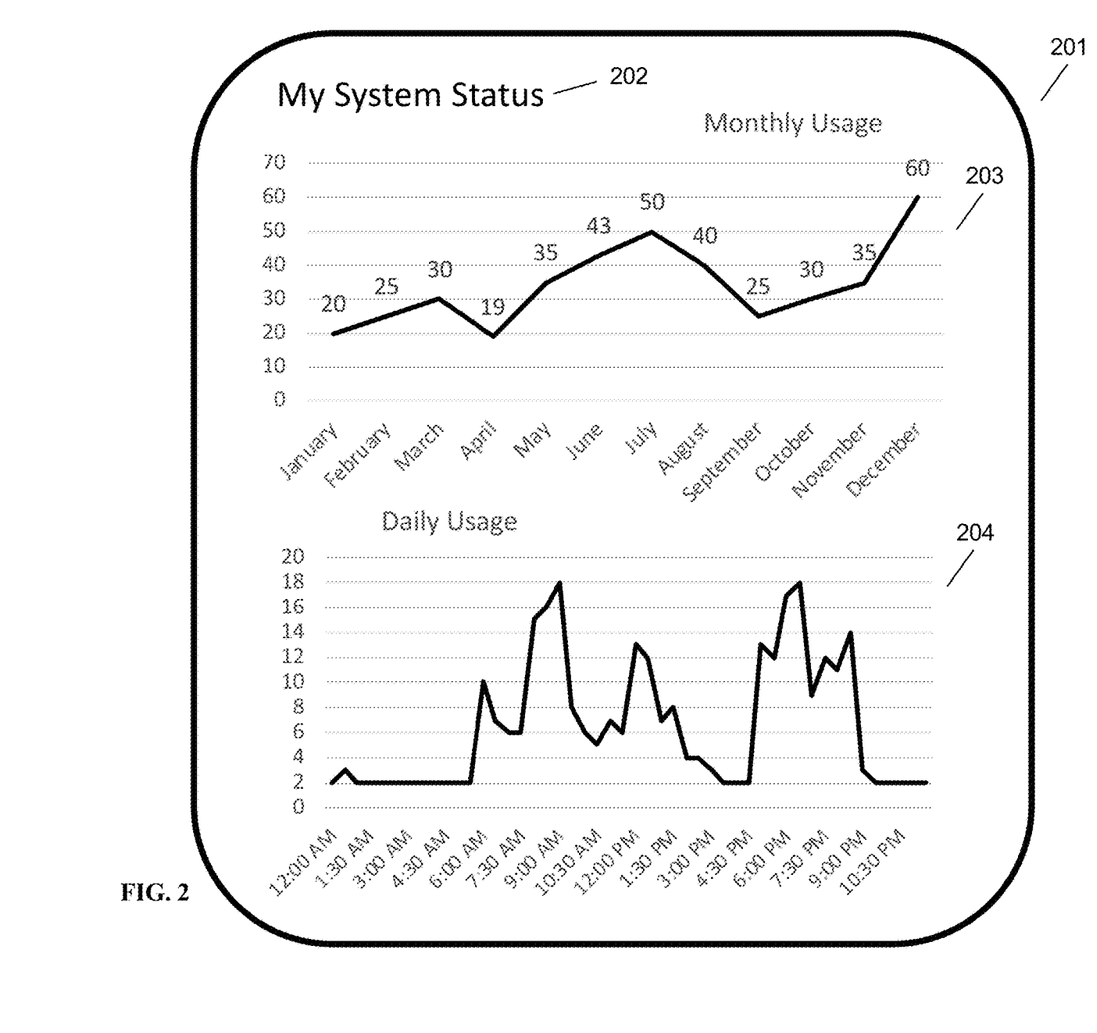
FIG. 2 is a first exemplary screen for a community RAN mobile application, in accordance with some embodiments.

FIG. 2 is a first exemplary screen for a community RAN mobile application, in accordance with some embodiments. Screen 201 shows an exemplary screen of a mobile application as it would be shown on a mobile device, such as a smartphone or touchscreen tablet computer. Title 202 shows that this screen shows the status of a mobile network. This status may include monthly usage graph 203, daily usage graph 204, statistics relating to bandwidth used or bits downloaded/uploaded, etc. The graphs and status shown could also reflect other parameters in the network, for example, signal strength, signal quality, RSSI, utilization percentage, load, etc. The graphs and status could be shown relating to an individual user's usage, or could show usage relating to all users on the community self-managed RAN. In some embodiments usage information regarding the whole community could be restricted to administrators. In some embodiments, more detailed information may be available on click-through of individual statistics or graphs.

Figure 3:
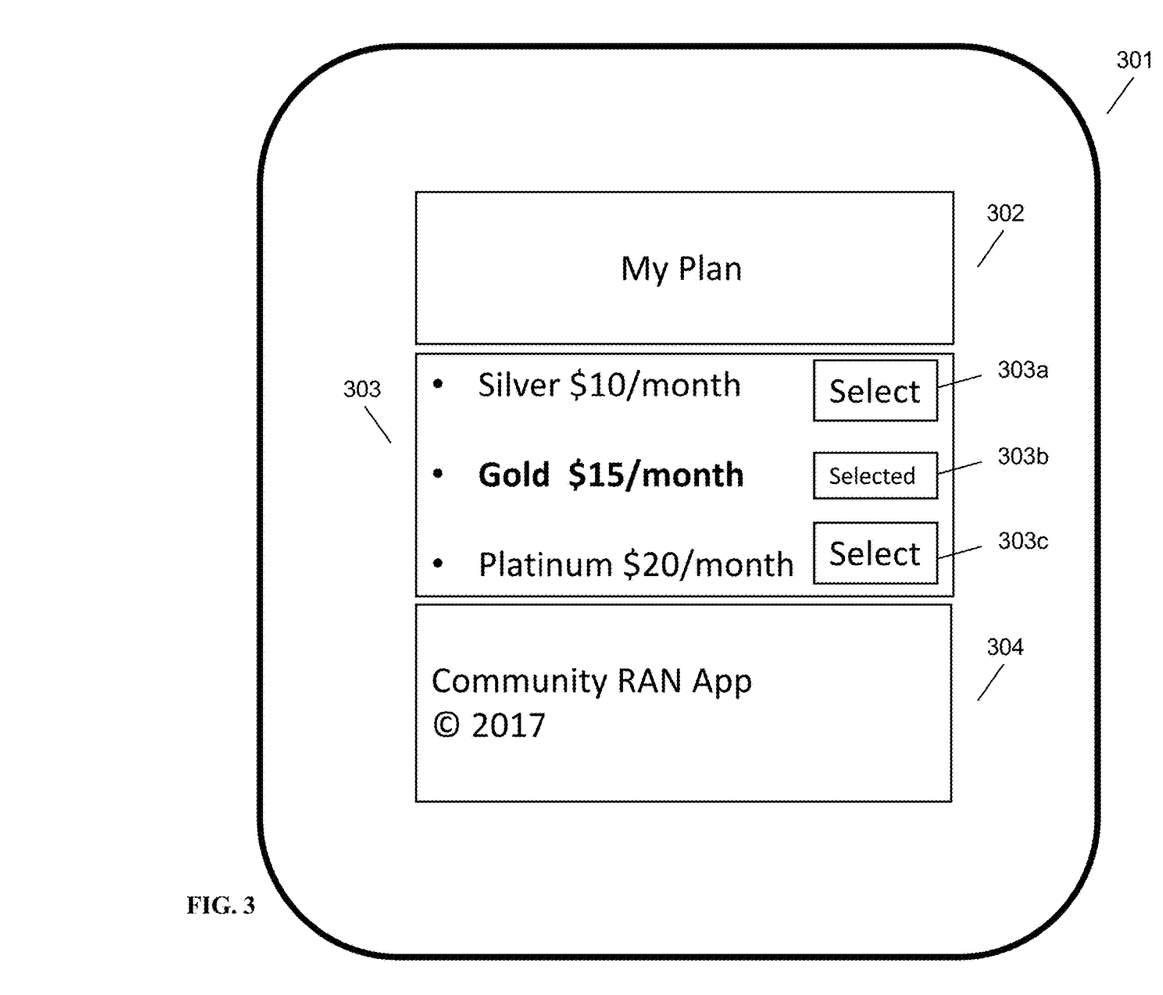
FIG. 3 is a second exemplary screen for a community RAN mobile application, in accordance with some embodiments.

FIG. 3 is a second exemplary screen for a community RAN mobile application, in accordance with some embodiments. Screen 301 shows an exemplary screen of a mobile application as it would be shown on a mobile device, such as a smartphone or touchscreen tablet computer. Title 302 shows that this screen shows an individual user's currently-selected plan. Section 303 shows that three tiers of plan are available: Silver at a cost to the user of $10/mo., Gold at a cost of $15/mo., and Platinum at a cost of $20/mo. These tiers may be clicked through to obtain further information, in some embodiments. The tiers may reflect different levels of service as explained elsewhere herein. The costs shown may be dynamically updated based on current usage, in some embodiments. The buttons 303a, 303b, and 303c are provided to enable the user to change his or her plan on this screen Legend 304 is a copyright identification statement.

Figure 4:
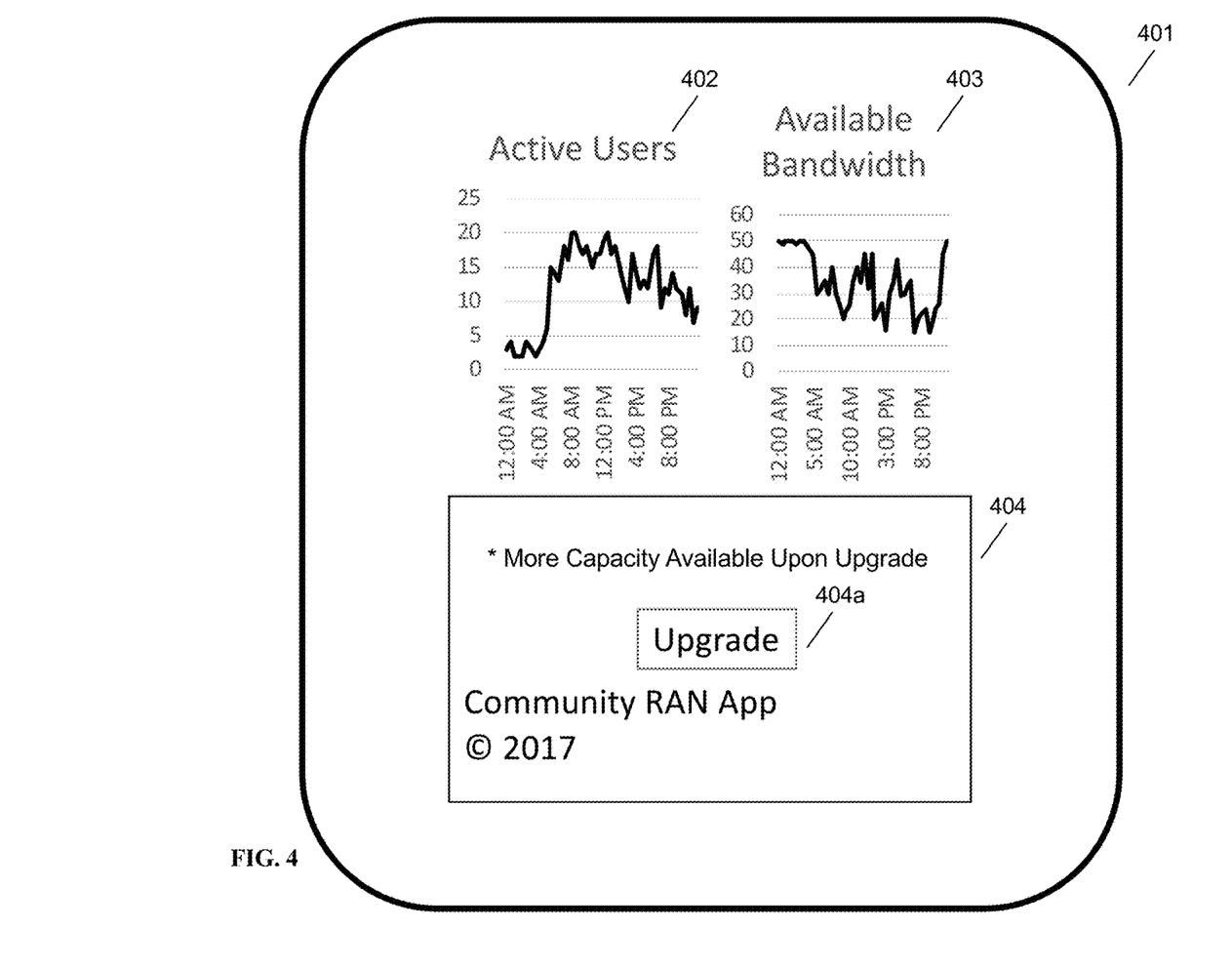
FIG. 4 is a third exemplary screen for a community RAN mobile application, in accordance with some embodiments.

FIG. 4 is a third exemplary screen for a community RAN mobile application, in accordance with some embodiments. Screen 401 shows an exemplary screen of a mobile application as it would be shown on a mobile device, such as a smartphone or touchscreen tablet computer, in this case for an administrative user. Chart 402 shows a count of active users per time of day. Chart 403 shows available bandwidth per time of day, shown as an average; the community shown has 50 Mbps available at peak. Section 404 explains the procedure for upgrading the service provided to the community, whether based on available speed, throughput, or some other metric. Button 404a allows for a secure message to be sent to the mobile operator to immediately upgrade service. Payment information may also be entered via the mobile app, in some embodiments, or may be stored by the mobile operator. It is possible, in some embodiments, for individual administrative users to pay for more service immediately using their own personal funds or credit cards, and for payment to take effect immediately, and for service upgrades to be configurable in length. For example, a user may desire faster speeds for the next month and may pay out of pocket to upgrade his or her whole community.

Figure 5:
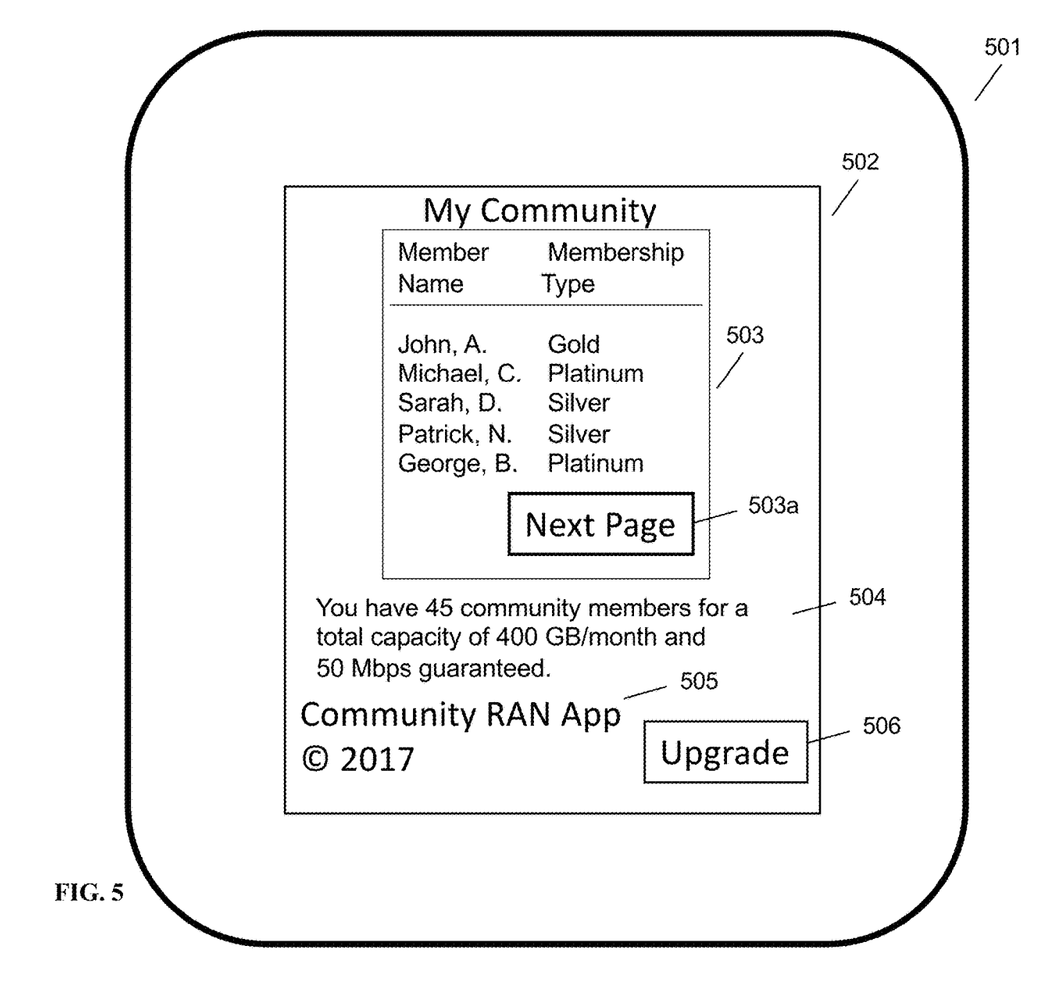
FIG. 5 is a fourth exemplary screen for a community RAN mobile application, in accordance with some embodiments.

FIG. 5 is a fourth exemplary screen for a community RAN mobile application, in accordance with some embodiments. Screen 501 shows an exemplary screen of a mobile application as it would be shown on a mobile device, such as a smartphone or touchscreen tablet computer, in this case for an administrative user. Community membership screen 502 includes a listing 503 of members by name and membership type, for use, for example, by the administrator to reach out to members of the community or to allow the administrator to assess needs, etc., of the community. Pagination of the listing is optionally available using button 503a. A brief summary 504 is shown, showing that there are a total of 45 community users and 400 GB/month in total data available and a bandwidth cap of 50 Mbps. A copyright legend 505 is shown. An upgrade button 506 is also shown to immediately upgrade service (further discussion also at FIG. 4).

Figure 6:
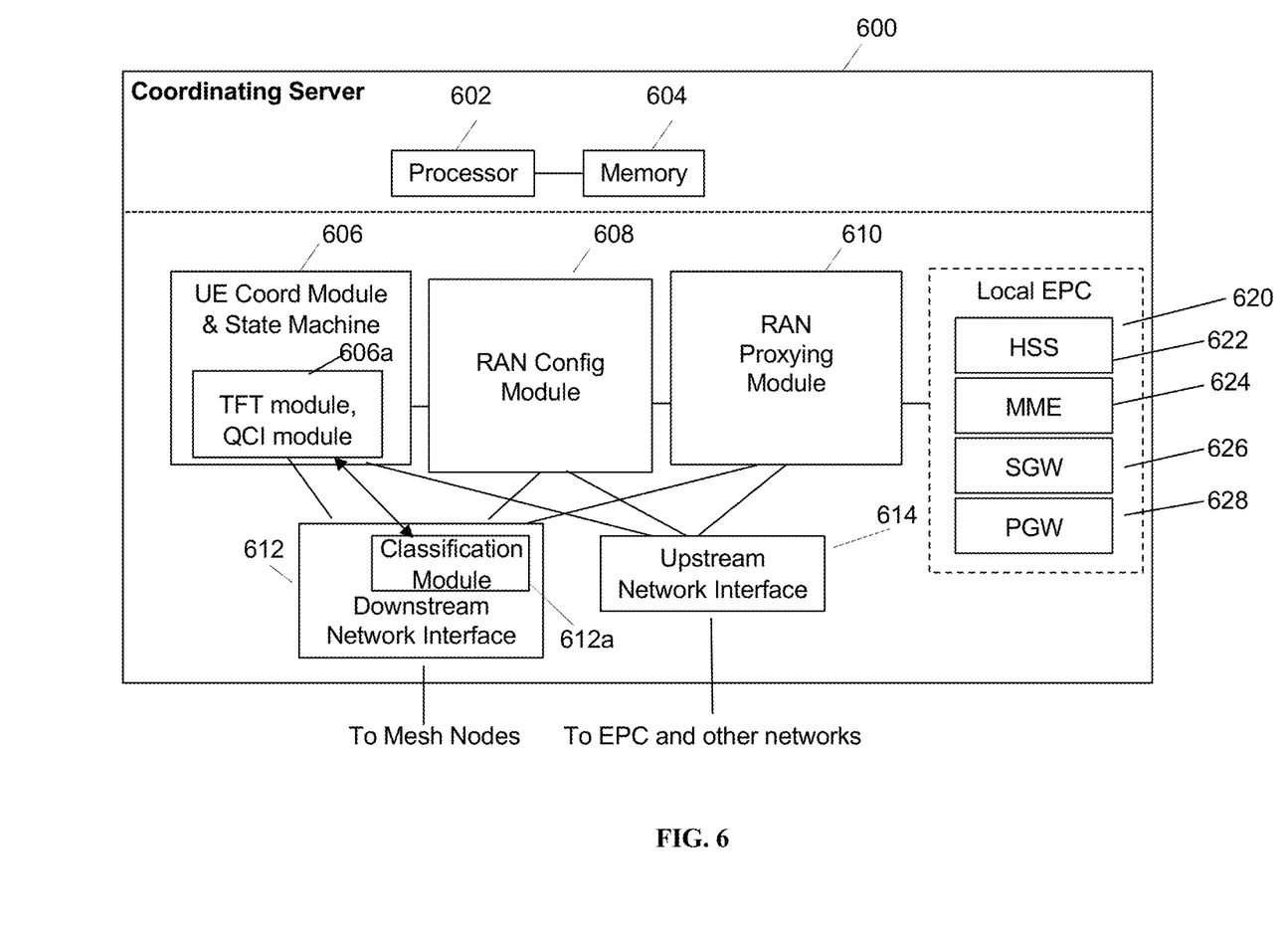
FIG. 6 is a schematic diagram of a coordinating node, in accordance with some embodiments.

FIG. 6 is a schematic diagram of a coordinating node, in accordance with some embodiments. The coordinating node may also be known as coordinating server or gateway or gateway node or gateway server, etc., in this disclosure. Coordinating node 600 includes processor 602 and memory 604, which are configured to provide the functions described herein. Also present are UE coordination module and state machine 606, RAN configuration module 608, and RAN proxying 610. UE coordination module 606, and in particular TFT module/QCI module 606a, may perform the functions described herein for QOS management, including matching incoming traffic to bearers using filters and mapping IP options to DSCP or QCI values. RAN configuration module 608 may coordinate installed TFT filters across the network (e.g., at eNodeBs) with TFT module 606a. In some embodiments, coordination server may also provide proxying, routing virtualization and RAN virtualization, via module 610. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet). Downstream network interface 612 may further include classification module 612a in communication with TFT module/QCI module 606a. Classification module 612a may perform classification of traffic before sending messages to nodes in the downstream direction. Signaling storm reduction functions may be performed in module 606. The coordinating node may be located in the network as shown in FIG. 1 as signaling coordinator 105. Management functions for the community RAN may be performed on the general purpose processor 602.

Coordinating node 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In some embodiments, the gateway of FIG. 6 may be a virtualized radio access network or may provide virtual network functions (VNFs). For example, the gateway of FIG. 6 may be equipped and provisioned to provide a cloud radio access network (CRAN) virtual network function (VNF), with real-time elastic scheduling, real-time X2 brokering, real-time self-organizing network (SON) capability with load balancing, mobile edge computing (MEC) capability, video traffic optimization, software defined networking (SDN) with unlicensed assisted backhaul and quality of experience (QoE) management. The VNFs provided on this gateway may be located at a particular hardware node or moved around in containers or virtual machines within a data center. One of the VNFs may be a community RAN management VNF.

In some embodiments, the gateway node may receive messages from the RAN nodes pertaining to alarms and warnings from the RAN, and may provide appropriate functionality to the end user via a web page or mobile app for remediating the alarm or warning situation. Examples of alarms and warnings include: antennas indicating they are out of alignment; loss of power; excessive signal interference on a particular radio band; one or more malfunctioning or rogue devices connected to the network; a RAN node that has disappeared from the network; a RAN node that is reporting an equipment failure; etc.

The gateway node may report differently to the core network for a community self-managed network. For example, with a network that is intended to be self-managed, the gateway node may only report information from time to time as a digest, or upon request, instead of reporting all information (for example, debug logs, system logs, heartbeats, system status reports, signal strength reports, user equipment (UE) error messages, base station error messages). The gateway node may be configured to report only information that is outside of a configurable reporting band, such as when the utilization of a designated backhaul network link hits a configurable threshold (say, 90%) for a sustained period of time (say, 24 hours), or if a high number of error messages or a high error rate is detected. By simplifying management for the core network, the resources required of the telecom operator may be reduced, both in personnel and in data storage and processing. Of course, the gateway node may provide all the same management functionality and reporting that is typically afforded to a core network as well, in some embodiments.

Figure 7:
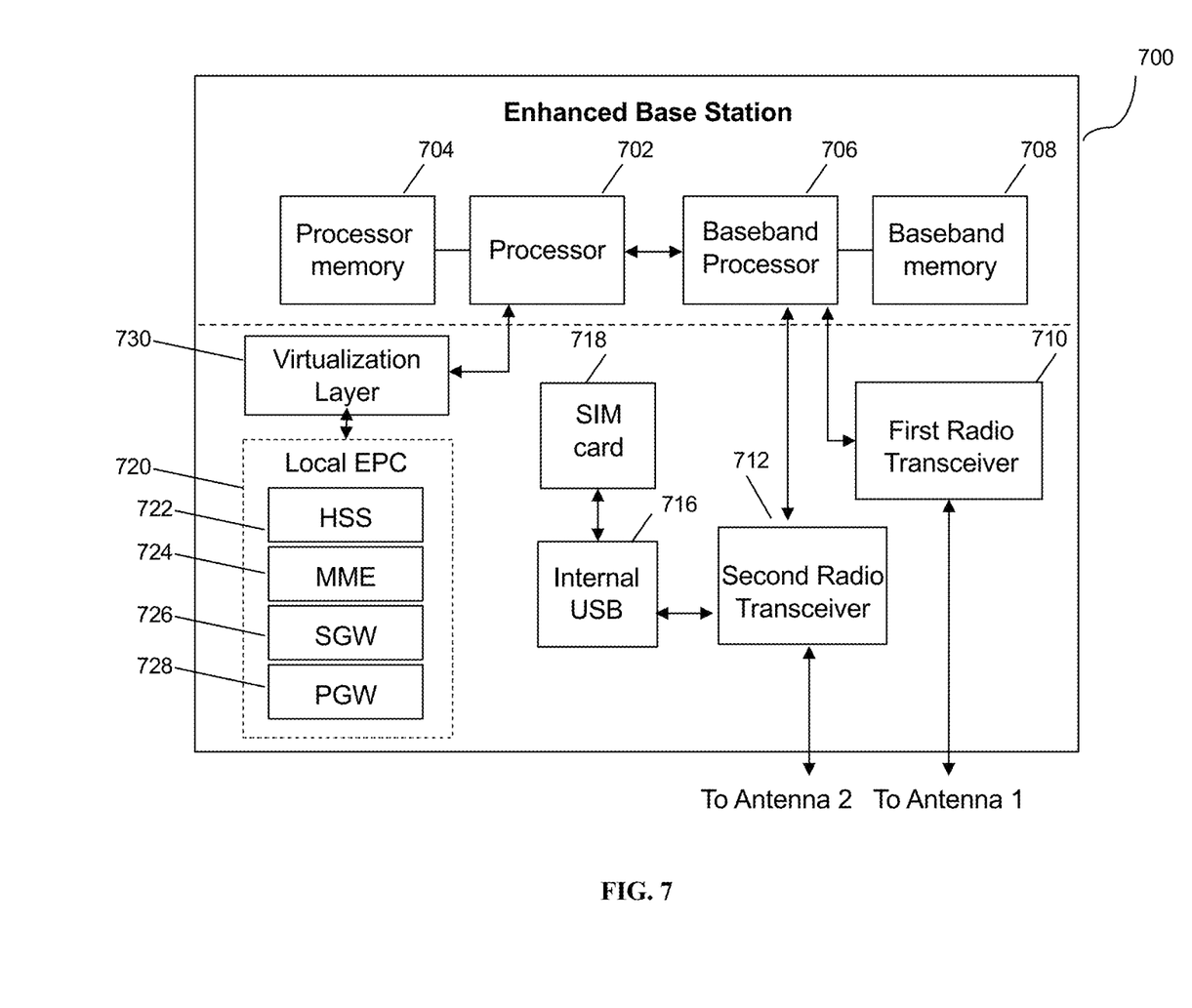
FIG. 7 is a schematic diagram of an enhanced eNodeB, in accordance with some embodiments.

FIG. 7 is a schematic diagram of an enhanced eNodeB, in accordance with some embodiments. Enhanced eNodeB 700 may include processor 702, processor memory 704 in communication with the processor, baseband processor 706, and baseband processor memory 708 in communication with the baseband processor. Enhanced eNodeB 700 may also include first radio transceiver 710 and second radio transceiver 712, internal universal serial bus (USB) port 716, and subscriber information module card (SIM card) 718 coupled to USB port 714. In some embodiments, the second radio transceiver 712 itself may be coupled to USB port 716, and communications from the baseband processor may be passed through USB port 716.

A scheduler 730 is shown, and may perform operations as described elsewhere herein. Specifically, scheduler 730 may receive communications from attached UEs, such as measurement reports, and ANR information from the eNB itself, and may forward them to a coordinating server (identified in FIG. 7 as "to global scheduler"). Scheduler 730 performs essential scheduling functions as required by the LTE standard, sending out scheduling information every 1 TTI for all UEs attached to eNodeB 700, but may incorporate hints or allocated resources via hash values received from the global scheduler at local scheduler 730. Local scheduler 730 may include a mapping to identify what resources have been allocated by reversing or otherwise interpreting the hashed hints and resource allocations received from the global scheduler.

The processor 702 may be in communication with a local evolved packet core (EPC) module 720, for authenticating users, storing and caching priority profile information, and performing other EPC-dependent functions when no backhaul link is available. This local EPC may be dedicated to the community self-managed RAN. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Scheduler 730 and local EPC 720 may each run on processor 702 or on another processor, or may be located within another device.

Processor 702 and baseband processor 706 are in communication with one another. Processor 702 may perform routing functions, and may determine if/when a switch in network configuration is needed. Baseband processor 706 may generate and receive radio signals for both radio transceivers 710 and 712, based on instructions from processor 702. In some embodiments, processors 702 and 706 may be on the same physical logic board. In other embodiments, they may be on separate logic boards.

The first radio transceiver 710 may be a radio transceiver capable of providing LTE eNodeB functionality, and may be capable of higher power and multi-channel OFDMA. The second radio transceiver 712 may be a radio transceiver capable of providing LTE UE functionality. Both transceivers 710 and 712 are capable of receiving and transmitting on one or more LTE bands. In some embodiments, either or both of transceivers 710 and 712 may be capable of providing both LTE eNodeB and LTE UE functionality. Transceiver 710 may be coupled to processor 702 via a Peripheral Component Interconnect-Express (PCI-E) bus, and/or via a daughtercard. As transceiver 712 is for providing LTE UE functionality, in effect emulating a user equipment, it may be connected via the same or different PCI-E bus, or by a USB bus, and may also be coupled to SIM card 718.

SIM card 718 may provide information required for authenticating the simulated UE to the evolved packet core (EPC) in an operator core network for backhaul purposes. When no access to an operator EPC is available, local EPC 720 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 700 is not an ordinary UE but instead is a special UE for providing backhaul to device 700.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 710 and 712, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 702 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 702 may identify the appropriate network configuration, and may perform routing of packets from one network interface to another accordingly. Processor 702 may use memory 704, in particular to store a routing table to be used for routing packets. Baseband processor 706 may perform operations to generate the radio frequency signals for transmission or retransmission by both transceivers 710 and 712. Baseband processor 706 may also perform operations to decode signals received by transceivers 710 and 712. Baseband processor 706 may use memory 708 to perform these tasks.

Further details about the gateway node and the base stations are provided in the other documents referenced herein and incorporated by reference. Any and all features are contemplated as being able to be managed, where appropriate, in the context of a self-managing community network.

Authentication

In some embodiments, the community self-managed network may require UEs to be authenticated using industry standard protocols, e.g., with a Home Subscriber Server (HSS) or Home Location Register (HLR) in an industry-standard core network. Once authenticated, the network may provide service. In some embodiments the network may cache authentication credentials to reduce reliance on the remote authentication server.

In other embodiments the network may use alternative means of authentication, e.g., in a manner similar to a captive Wi-Fi network wherein a user is required to enter username and password, and optionally credit card information, at time of connection to the network into a web-based interface toward an authentication agent hosted at a server/gateway in the self-managed network. In cases where a mobile device without a SIM card is contemplated to be used, the username and password authentication method may be used.

In some embodiments these two authentication mechanisms may be combined in various ways. For example, the community self-managed network may allow only a certain set of UEs with authorized SIM cards to connect to the network initially, and may require users to further log in using username and password to complete a process of authenticating to the network.

In some embodiments, authentication credentials may be based on the network topology (e.g., the network address or subnet) or network hardware address of a mobile device used to access the network, in a way similar to the trusted network subnet model used within enterprise networks for authenticating telephone devices and computer network devices; in certain cases, including the trusted subnet authentication case, a self-owned and managed private branch exchange (PBX) server may be bridged onto a community self-managed network.

In some embodiments, access to the management app or website may be granted or denied based on whitelists, blacklists, source network address, source network subnet, source gateway, or other mechanisms that allow the operator to restrict access by network topology to users who fall within the management area of the community self-managed RAN operator. In some embodiments, over-the-top (OTT) access via the Internet may be enabled for the management device in addition, with key-based, username and password-based, or other types of authentication.

The Core Network Functionality

A functionality is contemplated to be at the core network to interface with, e.g., the coordinating gateway; the base stations that are under management (in some cases joint management with the operator itself for an mobile virtual network operator or MVNO); and the administrative user interface, which may be located in various locations in the network. The key function of the core network functionality is to provide security, so that the community is not able to manage the operator's network and so that only designated individuals or users in the community can perform administrative actions in the community self-managed network. Other features of a core network, for example, roaming, lawful intercept, billing, etc., may be provided to the community through the core network functionality, but in the case of certain functions, no communication, handshake, or secure connection need be made to accomplish these standard functions of a core network. Details of this implementation may vary based on the specific core network software and deployment model. This may be implemented using a software module and an appropriate API, with messaging, authentication, and in some cases more sophisticated features such as QoS, queueing, SLAs, remote alarms, remote logging, etc.

Alternatives

The below alternatives apply to one or more embodiments of the present disclosure.

In some embodiments, public safety telecommunications networks may be enabled to be managed by the systems and methods in the present disclosure. For example, a public safety organization, such as a police department or a fire department, may be tasked with establishing emergency communications in a community. The public safety organization may employ the methods and systems described herein to provide management for the emergency communications network, and may manage the base stations, core networks, interconnects, and other components of the network using the present system.

In some embodiments, in-vehicle base stations may be enabled to be managed by the systems and methods in the present disclosure. For example, a public safety organization, such as a police department or a fire department, may be tasked with establishing emergency communications in a community using in-vehicle base stations. In-vehicle base stations have specific management challenges, such as the following: each base station may be configured to turn on and turn off based on the velocity of the base station (see U.S. Pat. No. 9,585,118, hereby incorporated by reference); each base station may be configured to employ other base stations for backhaul (see U.S. Pat. No. 8,867,418, hereby incorporated by reference); each base station may be configured to provide priority or quality of service (QoS) for applications running over the mobile base station; each base station must be enabled to permit handovers of mobile backhaul while an in-vehicle base station is in motion (see U.S. Pat. App. Pub. No. US20180063753A1, hereby incorporated by reference). The organization may employ the methods and systems described herein to provide management for the emergency communications network, including any in-vehicle base stations thereof.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, including FDD and TDD in different bands, the base stations may also support other air interfaces, such as UMTS/HSPA, CDMA/CDMA2000, GSM/EDGE, GPRS, EVDO, other 3G/2G, legacy TDD, or other air interfaces used for mobile telephony. The inventors have appreciated that the systems and methods disclosed herein are suitable for use with 3G as well as 4G and LTE applications, as, e.g., PDP contexts have many of the same characteristics as LTE bearers and as tunneled backhaul may be used for 3G as well as 4G. 5G may also be supported accordingly, as well as new versions of DSCP, TOS, QCI, etc. using the disclosed systems and methods. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems. Wherever IMSI or IMEI are mentioned, other hardware, software, user or group identifiers, can be used in conjunction with the techniques described herein.

Those skilled in the art will recognize that multiple hardware and software configurations could be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention could be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims. For example, an ordered sequence of multiple uplink cells may be selected by the coordinating node.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

The above-described features and applications can be implemented as software processes that are specified as a set of instructions recorded on a computer-readable storage medium (also referred to as computer readable medium). When these instructions are executed by one or more processing unit(s) (e.g. one or more processors, cores of processors, or other processing units), they cause the processing unit(s) to perform the actions indicated in the instructions. Examples of computer readable media include, but are not limited to, CD-ROMs, flash drives, hard drives, RAM chips, EPROMs, etc. The computer-readable media does not include carrier waves and electronic signals passing wirelessly or wired connections.

In the specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronics systems, define one or more specific machine implementations that execute and perform the operations of the software programs.

A computer program (also known as program, software, software application, script, or code) can be written in any form of programming language, including compiled or interpreted languages, declarative or procedural languages, and it can be deployed in any form, including as a standalone program or as a module, component, subroutine, object, or another unit suitable for use in a computing environment. A computer program may, but need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored in the circuit itself.

As used in this specification and any claims of this application, the terms "computer", "server", "processor", and "memory" all refer to electronic or other technological devices. These terms exclude people or groups of people. For the purpose of the specification, the terms display or displaying means displaying on an electronic device. As used in this specification and any claims of this application, the terms "computer-readable media" and "computer readable medium" are entirely restricted to tangible, physical objects that store information in a form that is readable by a computer. These terms exclude any wireless, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, or any other available monitor types, for displaying information to the user and a keyboard and a pointing device, e.g., mouse or trackball, by which the user can provide input to the computer. Other kinds of devices can be used to provide for interaction with a user as well; for example, feedback provided to the user can be any form of sensory feedback, e.g., visual feedback, tactile feedback, or auditory feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication network include a local area network ("LAN"), an inter-network (e.g., the Internet), and peer-to-peer networks (e.g., ad-hoc peer-to-peer networks).

The subject matter described in this specification can be implemented using client-side applications, web pages, mobile web pages, or other software as generally known in the art and that would be usable to end-user customers (for community self-managed RAN apps) and/or mobile operator end users. The subject matter could alternately be delivered or implemented using an API, such as a SOAP API, a JSON API, a RESTful API, in lieu of or in conjunction with a direct end-user interface. The subject matter could use messaging queues, webhooks, server-side containers, or any other technology known in the art.

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purpose of displaying data to and receiving user input from a user interacting with the client device). Data generated at the client device (e.g., a result of the user interaction) can be received from the client device at the server.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like; and desktop apps and web apps can be used in place of or in conjunction with mobile apps. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A system, comprising:
    a management functionality in a telecommunications core network, in communication with at least two base stations providing wireless access to one or more mobile devices and located in a community, for authorizing management activities for the at least two base stations; and
    a user-facing administration module in communication with the management functionality, the user-facing administration module providing management control to an administrative user in the community,
    wherein the management functionality is configured to send instructions to the at least two base stations to apply quality of service (QoS) tags and to use the applied QoS tags to enforce bandwidth and throughput limits based on input from the administrative user, and
    wherein the user-facing administration module is configured to provide monitoring of user usage statistics for the community and available bandwidth on a backhaul connection for the community.

2. The system of claim 1, wherein the at least two base stations provide access to the one or more mobile devices using one or more of: 2G, 3G, 4G Long Term Evolution (LTE), 5G, or Wi-Fi.

3. The system of claim 1, wherein the at least two base stations share a wireless backhaul connection.

4. The system of claim 1, wherein the at least two base stations are managed by the management functionality and wherein the management functionality in the core network is configured to provide operational control of one or more of: per-user throughput; per-user total data for a specified period; per-user priority; and priority for user plane data sent between the at least two base stations and the core network.

5. The system of claim 1, wherein the at least two base stations are managed by the management functionality and wherein the management functionality in the core network is configured to provide operational control of one or more of: transmit power; antenna directionality; modulation schemes; physical layer (PHY) parameters; mesh network routing; backhaul link selection; and radio access technology (RAT) steering.

6. The system of claim 1, wherein the at least two base stations are managed together by the management functionality as part of a single community-managed radio access network (RAN).

7. The system of claim 1, wherein the at least two base stations have a secure connection with a gateway connecting the at least two base stations to the core network, and wherein the gateway has a secure connection with the management functionality in the core network.

8. The system of claim 1, wherein the at least two base stations are configured to receive instructions to apply quality of service (QoS) tags and to use the applied QoS tags to enforce bandwidth and throughput limits.

9. The system of claim 7, wherein the user-facing administration module is located at one of the at least two base stations or at the gateway.

10. The system of claim 1, wherein the user-facing administration module is located on the Internet or located on a network accessed via the core network.

11. The system of claim 1, wherein the user-facing administration module enables the administrative user to monitor user usage statistics for individual end users in the community.

12. The system of claim 1, wherein the user-facing administration module enables the administrative user to monitor user usage statistics and available bandwidth on a backhaul connection for the community.

13. The system of claim 1, wherein the user-facing administration module enables individual end users in the community to upgrade a service plan, and wherein the user-facing administration module causes an operational change to be made in the at least two base stations based on the upgraded service plan.

14. The system of claim 1, wherein the user-facing administration module enables individual end users to initiate payment.

* * * * *